H. L. ISHAM.
Vehicle Axle-Box.

No. 206,114. Patented July 16, 1878.

WITNESSES
Wilmer Bradford,
James H. Langer

H. L. Isham.
INVENTOR
per Edson Brothers
Attorneys.

N. PETERS, PHOTO-LITHOGRAPHER, WASHINGTON, D C.

UNITED STATES PATENT OFFICE.

HARRY L. ISHAM, OF PLATTSBURG, NEW YORK.

IMPROVEMENT IN VEHICLE-AXLE BOXES.

Specification forming part of Letters Patent No. 206,114, dated July 16, 1878; application filed June 11, 1878.

*To all whom it may concern:*

Be it known that I, HARRY L. ISHAM, of Plattsburg, in the county of Clinton and State of New York, have invented certain new and useful Improvements in Carriage-Axle Boxes; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
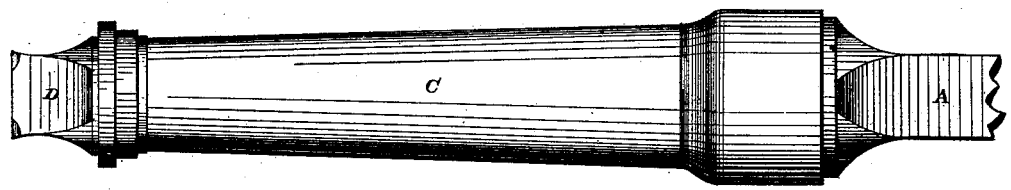
Figure 2:
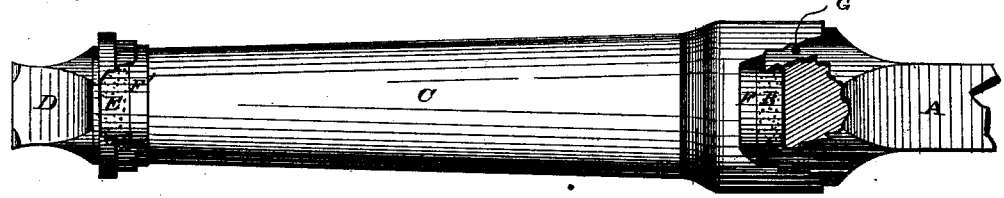
Figure 3:
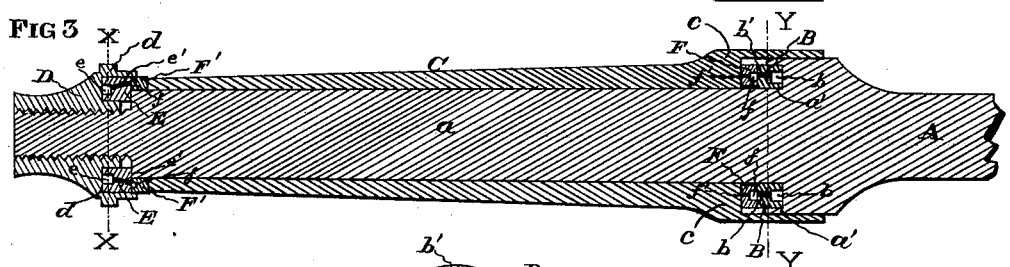
Figure 4:
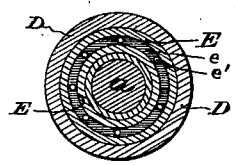
Figure 6:
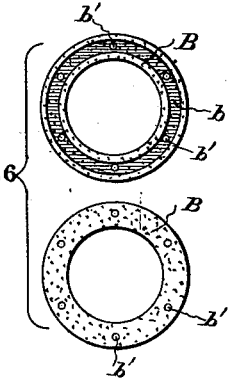
Figure 5:
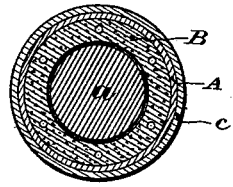
Figure 7:
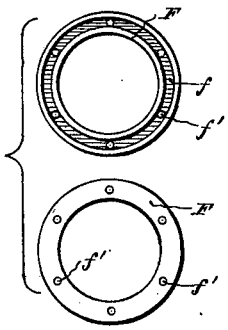
Figure 8:
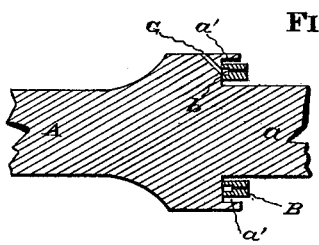

Figure 1 is a side elevation of my improved carriage-axle box. Fig. 2 is a similar view, having a portion broken away to show the rubber cushion and leather washer at each end of the axle-spindle. Fig. 3 is a central longitudinal section of same. Fig. 4 is a section on line $x\ x$ of Fig. 3. Fig. 5 is a section on line $y\ y$ of Fig. 3. Fig. 6 is a front and rear view of the perforated channeled rubber ring or cushion. Fig. 7 is a similar view of the leather washer, and Fig. 8 is a detail view of a modification of my device.

Corresponding parts in the several figures are denoted by like letters of reference.

My invention relates to improvements in carriage-axle boxes, the object of which is to provide a cheap, durable, and efficient cushion for the axle-box, which, when in position, will, by its elasticity, prevent the lateral movement of the said axle-box on the axle from producing violent concussions or noise, to exclude dust and grit from the axle, and to increase the durability and add to the comfort of the vehicle; and it consists of a rubber ring or cushion resting in a recess or slot turned in the nut and in the shoulder of the axle, and of a rubber cushion or ring channeled and perforated, together with a leather or other suitable washer, which may be channeled and perforated, the channels made in the inner faces of the said rubber rings so shaped as to form, with the chambers in the nut and shoulder of the axle, receptacles for a lubricating substance, which will flow out in the bearings of the axle when the washers are pressed against the rubber cushions or rings, substantially as hereinafter more particularly set forth.

In the annexed drawing, A marks the axle, having the bearing portion or spindle $a$ of the usual construction, in the shoulder of which is a groove or recess, $a'$, which receives a rubber ring or cushion, B, provided on its inner surface or face with a channel or groove, $b$, and holes or perforations $b'\ b'$, which run from said groove $b$ to the outer surface or face of the said cushion. C is the box, having the hood $c$, projecting over the chambered shoulder of the axle A.

The nut D is provided with a recess or groove, $d$, and channeled and perforated rubber ring or cushion E $e\ e'$ resting therein, similar in construction to the recess $a'$ in the axle A and the rubber cushion B. Encircling the spindle $a$, immediately in front of the rubber cushions B and E, are leather or other suitable washers, F $f\ f'$ F', which may be channeled and perforated in a manner similar to the ring B.

The cushion B may be made of considerably less diameter than the recess $a'$, as shown in Fig. 8, which would give greater elasticity to the said cushion, and require less force to overcome its resistance.

A slanting perforation or slot, G, is made in the shoulder of the axle A, into which a lubricating substance may be poured to fill the channel $b$ of the cushion B.

It will be seen that when the box presses against the leather washer, and that against the rubber cushion, the lubricating substance will be forced through the perforations in said cushion and washer to the spindle, thus lubricating the latter.

I am aware that a spiral metallic spring resting in a recess formed in the shoulder of the axle, and covered or protected by a hood formed on the axle-box, has been used to act as a cushion for said axle-box; but the objections and disadvantages of the spiral metallic spring are that their elasticity, without which they have no value, is not permanent, but is easily lost or impaired by use, sudden blows, cold, &c.; they are easily displaced, as they rest upon one point only at each end of the box; they open a passage-way for dust and grit to the spindle; they cannot be used on the common tapered axle, but, on the contrary, require an expensive straight-arm axle, in order to act freely; on a tapered axle, under strong pressure, they are liable to displacement, and if displaced, or the shoulder-spring be broken, they would set the box at once; they lack uniformity of elastic power, differences in this respect causing the wheels of a vehicle to move on different planes, in which case they do not "track;" and they are expensive, not easily attached, and difficult to control and confine. By practical use, I find my device overcomes all these objections; and by channeling and perforating the rubber cushions, I combine the use of both a cushion and an oiler.

The elasticity of the rubber cushions is not affected by changes of temperature, blows, and concussions, and their use is unaccompanied by rattling noises, and has a bearing-surface at every point of its periphery.

Having thus described my invention, what I claim, and desire to secure by Letters Patent, is—

1. A rubber-cushion ring, B, with a leather or other suitable washer, F, in combination with the axle A $a$, having a recess, $a'$, turned in its shoulder, substantially as and for the purpose set forth.

2. The combination, with the axle A $a$, having the recess or groove $a'$, and box C, of the rubber ring or cushion B, having a channel, $b$, and perforations $b'$, substantially as and for the purpose set forth.

3. The combination of a channeled perforated rubber ring, B $b$ $b'$, and leather or other suitable washer F, with or without the channel $f$ and perforations $f'$, with the axle A $a$, having the recess $a'$, and box C, substantially as and for the purpose set forth.

4. The rubber cushion E, having a channel, $e$, and perforations $e'$, in combination with the nut D, having a recess, $d$, substantially as and for the purpose set forth.

In testimony that I claim the foregoing as my own I hereunto affix my signature in presence of two witnesses.

H. L. ISHAM.

Witnesses:
 JOHN W. LYNDE,
 H. S. ISHAM.